US005561702A

United States Patent [19]

Lipp et al.

[11] Patent Number: 5,561,702

[45] Date of Patent: Oct. 1, 1996

[54] PAGER HAVING REMOTELY PROGRAMMABLE CANNED MESSAGES

[75] Inventors: Ronald L. Lipp, Grand Prarie; David Rodriguez, Arlington, both of Tex.

[73] Assignee: Uniden America Corporation, Fort Worth, Tex.

[21] Appl. No.: 182,932

[22] Filed: Jan. 18, 1994

[51] Int. Cl.$^6$ ................................ G08B 5/22; H04B 1/16

[52] U.S. Cl. .................... 379/57; 455/186.1; 340/825.44

[58] Field of Search ................................ 379/57, 63, 88, 379/96, 97; 340/825.44, 825.22; 455/38.2, 38.1, 186.1, 88, 70, 68

[56] References Cited

U.S. PATENT DOCUMENTS

| | | | |
|---|---|---|---|
| 4,336,524 | 6/1982 | Levine | 340/311.1 |
| 4,422,071 | 12/1983 | de Graaf | 340/825.44 |
| 4,839,628 | 6/1989 | Davis et al. | 340/311.1 |
| 4,845,491 | 7/1989 | Fascenda et al. | 340/825.44 |
| 4,868,561 | 9/1989 | Davis | 340/825.44 |
| 4,910,510 | 3/1990 | Davis et al. | 340/825.44 |
| 4,959,644 | 9/1990 | Sato | 340/825.44 |
| 5,012,234 | 4/1991 | Dulaney et al. | 340/825.44 |
| 5,025,252 | 6/1991 | DeLuca et al. | 340/825.44 |
| 5,066,949 | 11/1991 | Breeden et al. | 340/825.44 |
| 5,113,427 | 5/1992 | Ryoichi et al. | 340/825.44 |
| 5,252,964 | 10/1993 | Tan et al. | 340/825.44 |
| 5,257,307 | 10/1993 | Ise | 340/825.44 |
| 5,294,922 | 3/1994 | Akahori | 340/825.44 |
| 5,345,227 | 9/1994 | Fascenda et al. | 340/825.44 |
| 5,381,138 | 1/1995 | Stair et al. | 340/825.44 |

FOREIGN PATENT DOCUMENTS

| | | | |
|---|---|---|---|
| 0360216 | 3/1990 | European Pat. Off. | G08B 3/10 |
| 0404007 | 12/1990 | European Pat. Off. | G08B 5/22 |
| 2219423 | 6/1988 | United Kingdom | H04B 5/04 |
| 8809104 | 11/1988 | WIPO | H04Q 7/00 |
| 9015511 | 12/1990 | WIPO | H04Q 7/00 |

OTHER PUBLICATIONS

NEC Information Disply Pager Courier Series User Manual, p. 16, Copyright 1990.

NEC Facts Provider Operating Instructions pp. 4–18, 19 and page.

*Primary Examiner*—Scott A. Rogers
*Assistant Examiner*—Fan Lee
*Attorney, Agent, or Firm*—Daniel R. Brown

[57] ABSTRACT

A select call receiver, such as a pager, is disclosed which comprises a canned message memory. The canned message memory has canned message memory storage locations that are linked to message tag identifiers. The pager recalls and displays canned messages upon receipt of message tag identifiers. In the first embodiment, the pager provides a programming mode wherein the user of the pager can remotely program canned messages into the pager by accessing a convention paging terminal and keying numeric data into a telephone keypad. The numeric data is converted to alphanumeric data according to a mnemonic entry scheme and stored in the pager's canned message memory. In a second embodiment, the message tag identifier is also remotely programmable by the user, allowing great flexibility in the definition of the message tag identifiers.

38 Claims, 9 Drawing Sheets

PAGER HAVING REMOTELY PROGRAMMABLE CANNED MESSAGES

TECHNICAL FIELD OF THE INVENTION

This invention pertains to select call receivers, such as radio pagers, and more particularly to the remote programming of canned data messages within the receivers.

BACKGROUND OF THE INVENTION

The present invention relates to select call receivers (pagers) used to receive various types of messages. Modern pagers are categorized by the method in which information is transferred to them and the way in which the information is provided to the user of the pager. For example, pagers have be categorized as "tone", "voice", "numeric", and "alpha-numeric" types.

Each category of pager has certain advantages and disadvantages which result from trade-offs between the cost of service, the cost of the pager itself, and level of information provided to the user upon receipt of a message. In a tone pager, for example, the pager produces an audible beep tone upon receipt of a message. A user of a tone pager will have established an understanding with the person who initiates a message that a certain action will occur as a result of receiving the message. The user may call a certain telephone number, for example.

Pager users have a need and a desire to receive more detailed messages from their pager in order to make the pager more flexible in its function and easier to use. In an alpha-numeric pager, the message received can be very detailed and easy to understand by virtue of the large choice of characters that can be transmitted and displayed in each message. There is a trade-off associated with these types of pagers in that the person initiating a message must communicate the details of the message to the paging carrier, who provides the paging service. For an alpha-numeric message, typically the person who initiates the message places a telephone call to the paging carrier and verbally states the message which is then entered by an operator at the paging carrier's office into a paging terminal for subsequent transmission to the desired pager. This procedure is more expensive than other categories of service because of the requirement to convert a verbal message into a digital form which can be transmitted to the pager. Furthermore, the quantity of characters transmitted is large, using more available transmitter air time. In paging systems with large numbers of users, this can limit the quantity of users who can share a system and delay transmission of messages due to a backlog of messages to be sent.

Numeric pagers strike an acceptable balance between the quantity of information presented in a message and the resources necessary to send a message. It is common for a message to be initiated by placing a telephone call to an automated paging terminal. Then the pager identity and numeric message information are entered using the key pad on a telephone. The numeric message information is subsequently transmitted to the pager and displayed on a display in the pager. It is common that the numeric information is a telephone number. The user, upon viewing the received message, places a telephone call to the number displayed in response to the message. Because of the foregoing, numeric pagers have become popular and are the most widely used type of pager in the United States.

Numeric pagers have been adapted to provide a greater quantity of information without significantly increasing the number of digits transmitted in a single message. For example, numeric pagers are available which have alpha-numeric displays that display alpha-numeric messages in response to numeric codes they receive. Such a pager may have a memory which links a two digit numeric value and a canned alpha-numeric message. "00" might be linked with "URGENT", for example. Being such, a message can be transmitted with a "00" in addition to the usual numeric message. Upon receipt of the message, the pager would parse the "00" portion of the message from the whole message received, and recall the canned message "URGENT" linked therewith. Then, the pager would display "URGENT" on the first page of the display and the numeric message on the second page of the display. In this way, the user is clearly alerted that the message is urgent with the addition of only two numeric digits in the originally transmitted message. It is known that pagers are programmed with a variety of standard canned messages which are likely to be used from time to time. Each of these messages may have its own unique numeric identifier. The unique numeric identifier is called a message tag identifier or simply a tag. The tags can be comprised of one or more numeric digits and two digits is commonly used.

Canned messages are useful, but, they do not meet the user's needs in every situation. Often times, it is desirable to have a message which is customized to a particular need. A user might want to have the name of an associate available as a canned message, for example. Since canned messages are typically preprogrammed either at the time of manufacture or when the pager is initially programmed by the service provider, it is difficult for an end user to change or upgrade the list of canned messages. If a user desires to make a change in the list of canned message, the user is required to return the pager to the service provider to have a memory programming change made. Another limitation of canned messages is the two digit numeric code correlated to each message. It can be difficult and confusing for people who initiate messages to a pager users to remember which codes solicit which canned messages.

There may be many creative ways to improve the foregoing paging environment. Certainly in other communications media, many improved communications schemes could be envisioned. However, with pagers, there are certain constraints which limit the options for improving the communications scheme. The signaling protocol, the existing hardware infrastructure, and the limits of a telephone keypad as a data entry terminal define these limits. The signaling protocol which is widely used in paging is known as the POCSAG signaling protocol. Any improvements must be made under the constraints of the POCSAG protocol.

FIG. 1 illustrates a typical numeric paging system in the prior art. An automated paging terminal 1 is coupled to a broadcast antenna 2 which radiates radio waves that are received by pagers 3, 4, 5, or more. Messages are initiated by accessing a telephone 6, 7, 8 and placing a telephone call, via the public switched telephone network 9, to the paging terminal 1. Upon accessing the paging terminal, a PIN (Personal Identification Number) is entered which correlates to a capcode within the paging terminal thereby defining the particular pager which is intended to receive the message. Next, a numeric message is entered on the telephone keypad which is to be displayed by the pager. Having received a telephone call specifying the PIN of a particular pager and a numeric message, the paging terminal broadcast the capcode associated with the PIN together with the numeric message. Any pager with the specified capcode enabled will receive and decode the message.

The POCSAG protocol defines the encoding, transmission and decoding scheme used in many pagers. Each POCSAG transmission begins with a preamble. The preamble is a sequence of bit reversals used to alert the pagers of an upcoming broadcast. Following the preamble is a plurality of data batches, each of which begins with a synchronization code word that defines the beginning of each batch. Each batch contains eight frames of data. Each frame comprises two 32 bit code words which may contain an address code word or a message code word. Address code word data contains a capcode and is used to designate which pager is to receive the data, and, message code word data is the data which contains the message information.

Within each pager is stored one or more capcodes, in a capcode memory, which are unique codes that are compared with the address code word data in a broadcast data frame to determine if a particular message is intended for a particular pager. The use of address code word data and capcodes are well known to those skilled in the art and will not be discussed further.

Message code word data are received and decoded by a pager when the address code word and capcode correspond. Message code word data comprises 32 bits of information. The first bit is the address/message flag and is set to "1", by definition, for all message code word data. The next 20 bits of data contain the message, or a portion of the message, intended for the pager. The next 10 bits are used for error detection and correction, and the final bit is used for further error detection by even parity. If a message exceeds the 20 bit message data capacity of a single message code word frame, data from additional frames are concatenated with data from the initial frame to provide the necessary data capacity. The forgoing message code word data structure is well known to those skilled in the art and will not be discussed further.

The present invention sets forth an apparatus for adding flexibility and simplicity to the use of canned messages. This invention benefits people originating pages by simplifying the message input procedure, benefits the paging carrier by allowing more comprehensive messages to be communicated with little data overhead and no modifications to the infrastructure equipment, and benefits the pager user by adding the flexibility of programmable canned messages and improved information availability.

SUMMARY OF THE INVENTION

A select call radio receiving device is disclosed, such as a pager, which provides for improved entry, storage, and utilization of canned messages.

The present invention incorporates an operational mode in a select call receiver that comprises a programming mode in which the user can program canned messages into a memory in the select call receiver. The user has the capability to select and deselect the programming mode. In the first embodiment, the user selects a unique memory location by specifying a message tag identifier at the time the receiver is placed in the programming mode. Canned message data is entered using the existing paging system and protocols. The user places a telephone call to the automated paging terminal, which provides the user's paging service, via the public switched telephone network (PSTN) and enters data on a telephone DTMF keypad. While the select call receiver is set in the programming mode, the message data which are subsequently received are interpreted by the select call receiver to be program data and are stored in a canned message memory location that is linked with the message tag identifier previously selected. A coding scheme is described which provides for mnemonically entered alphanumeric data that references the letters assigned to the various keys on a standard telephone keypad. At other times, when the programming mode has been deselected and when a paging signal is received that includes a message tag identifier, the receiver recalls the canned message that is stored in the canned message memory location linked with the message tag identifier and displays the message along with any other numeric information which was transmitted along with the message tag identifier.

In the second embodiment of the present invention, the user places the select call receiver in a programming mode, but does not select a message tag identifier to define the canned message memory location in which to store the subsequent message. Rather, the user enters a message tag identifier into the telephone keypad together with the canned message to be sent. The message is received by the receiver together with the message tag identifier, and, the two are stored in an available pair of canned message memory locations which are linked with one another. When a message is subsequently received which includes a message tag identifier, the receiver scans the memory for a matching tag and recalls the canned message linked therewith. Such a scheme allows for the storage of any canned message to be in a location independent of the absolute memory structure of the pager. The message tag identifiers are not limited in their content to the canned message tag identifiers defined at the time of manufacture or initial programming, as in the prior art.

The second embodiment allows the user to define message tag identifiers that are easier to remember and that can be assigned to several different receivers to simplify utilization of canned messages.

Reference is directed to FIG. 2, which is a diagram of a conventional telephone keypad 10. The keypad comprises twelve keys including "1" 11, "2" 12, "3" 13, "4" 14, "5" 15, "6" 16, "7" 17, "8" 18, "9" 19, "*" 20, "0" 21, and "#" 22 keys. The keys "2" 12 through "9" 19 have most of the letters in the alphabet printed thereon. These letters may be used as a mnemonic reference to the numeral on which they are printed. For example, "JOE" could be represented as the numerals "563". The mnemonic reference being that the "5" key 15 has the letter "J" printed thereon, and the "6" key 16 has the letter "O" printed thereon, and so forth. Therefore, when a message originator named Joe wants to identify himself as the originator of a message, he enters the unique identifier "563" by typing his name on the telephone keypad. Assuming that a canned message had been previously stored which linked the message tag identifier "563" with a canned message such as "Call Joe", then that message would be displayed. This embodiment greatly improves the message clarity and ease of use for both the originator of the message and the user of the receiver.

Since message tag identifiers are programmed by the user and are not assigned to a specific absolute memory location, several pagers can use the same tags and multiple users can access the tags to summon desired messages. And, this can be done without coordinating the programming of the various pagers to use a specific tag identifier. This would be useful within an organization with several pager users where programing of the pagers is not coordinated between the various users in terms of absolute canned message memory storage locations. If a conventional message tag identifier were used, all pager programming would need to be coordinated so that the same location identifier, "09" for example, solicited the same message on every pager. For such a system to function, each pager would need to have the same message programmed into canned memory location linked with the tag memory location 09. With programmable tags, the canned messages can be stored in any of the available memory locations and still be accessible with the same message tag identifier.

BRIEF DESCRIPTION OF THE DRAWINGS

The features of the present invention, which are believed to be novel, are set forth with particularity in the appended claims. The invention, together with further objects and advantages thereof, may be best understood by making reference to the following description taken in conjunction with the accompanying drawings, in the several figures of which like reference numerals identify identical elements, and wherein:

DETAILED DESCRIPTION

Figure 3:
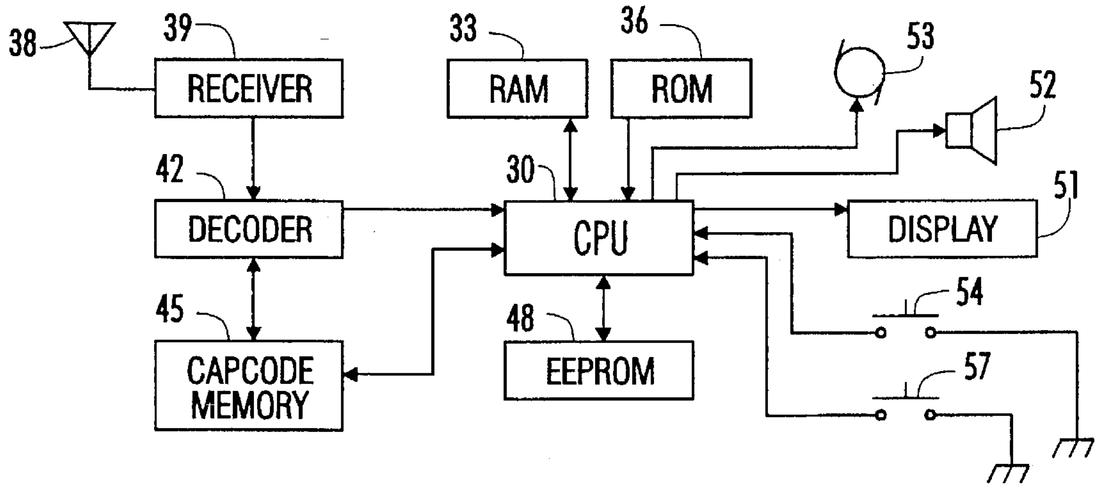
FIG. 3 is a block diagram of the selective call receiver of the first and second embodiments.

Reference is now directed to FIG. 3 which is a block diagram of the pager in the first and second embodiments of the present invention. The pager comprises an antenna 38 coupled to a receiver 39 which together enable the pager to received data messages broadcast via an RF carrier. The messages are transmitted as digital data which are encoded according to the POCSAG signaling protocol. The POCSAG protocol, by definition, comprises both address code word and message code word data. An address code word datum is commonly referred to as a capcode or ID code. The POCSAG signaling protocol is well known to those skilled in the art.

The receiver 39 transfers the received data to the decoder 42. As messages are received, the decoder, which is coupled to a central processing unit (CPU) 30, decodes and transfers the capcode ID received within the message to the CPU 30. One or more capcodes are stored in the capcode memory 45 which is also coupled to the CPU 30. The CPU 30 compares the received capcode with those recalled from the capcode memory 45. If a match is found, the CPU proceeds to receive the message codeword data portion of the message. In another embodiment, the decoder 42 is capable of comparing the received capcode with those stored in capcode memory 45 without intervention by the CPU 30.

The CPU 30 is further coupled to RAM 33, ROM 36 and EEPROM 48. Alternatively, it is also useful to use a central processing unit which has one or more of these memory modules incorporated therein. The ROM 36 is used for, among other purposes, storing the executable software embodying the function of the pager. The RAM 33 is used to store temporary variables and so forth. In the first and second embodiments of the present invention, the RAM is used to store received messages on a temporary basis while the pager is in a programing mode. The EEPROM 48 is a non-volatile memory used to store page messages and canned messages as they are received by the pager. A portion of this memory is referred to as page message memory. In the present invention, canned message memory areas have a message tag identifier linked with at least one of the canned memory storage location. Upon exiting the programing mode, messages are transferred from the temporary storage location in RAM, into the non-volatile canned message memory area in EEPROM. The page message memory area is of the conventional structure, known in the art.

A display 51 is provided which is coupled to the CPU 30. Liquid crystal (LCD) or other types of displays can be used. The display is capable of displaying alpha-numeric characters and has several icons for common functions such as low battery power, status indications, and etc. The display 51 is used to display messages that have been received and stored in the EEPROM 48. Each message may have one or more screens of information to be viewed. Each display screen is commonly know as a page of display.

One or more alarm indicators are coupled to the CPU 30 to alert the user as to when a message has been received. In the preferred embodiment, a beeper 52 and vibrator 53 are incorporated.

A first push-button key switch 54 and a second push-button key switch 57 are coupled to the CPU 30 to provide for user inputs in setting operating modes, making menu selections and displaying messages. Each push button key is connected to an input on the CPU which interprets the press of each key. These keys presses, taken in conjunction with character and icon displays, allows the user of the pager to navigate through a menu of function in order to select one of numerous functions. A pager could be designed, for example, with as few as one, or many push-button keys.

The normal operating mode of the receiver is the standby mode. In this mode, the CPU 30 periodically activates the receiver 39 for a predetermined period of time during which the pager checks to see if a signal is present. If no signal is present, the CPU 30 deactivates the receiver 39 and waits a second predetermined period of time before again activating the receiver. The foregoing procedure is repeated indefinitely until a signal is received. Upon receipt of a signal the received capcode is checked against the capcodes stored in the capcode memory and if a match is found between the received capcode and a capcode stored in the capcode memory 45, the received message is stored in the message memory and an alarm is sounded. The alarm may be of one or more types including visual, audible and tactile.

The standby mode may be exited upon user selection of a different operational mode of the pager. These other operational modes will be discussed hereinafter.

Figure 4:
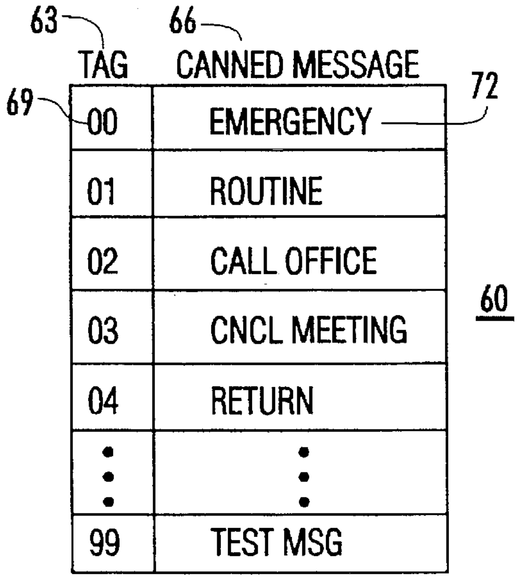
FIG. 4 is memory diagram of the prior art.

In the prior art, it is well known that numerical messages are simply displayed in numerical format. It is also well know that numerical codes, or message tag identifiers, can be linked with canned alphanumeric messages stored in memory, which are displayed upon receipt of such a message tag identifier. The message tag identifier is simply referred to as a tag. Reference is directed to FIG. 4 which is a memory map of the canned message memory table 60 stored in the pager EEPROM 48, as in the prior art. Each tag 63 is linked with a canned message 66. If the pager is in a mode to receive messages which incorporate a tag, then the pager will parse the tag from a received message, recall, and display the canned message linked therewith. In this way, a simple two digit numeric entry, "00" 69 for example, will cause the pager to display an alphanumeric canned message, "EMERGENCY" 72 for example. The canned messages are preprogrammed into the pager prior to delivery of the pager to the end user or can be changed after delivery with additional programming software and hardware. As such, the end user is supplied with a printed list of available tags and canned messages. The list can be referred to as messages are transmitted to the pager. The list of messages may vary in length, but can be 100, for example.

Pagers which embody the canned alphanumeric message capability may have dual display mode capability. This function comprises a numeric display mode and a message tag display mode. In the numeric display mode, all messages that are received by a pager are displayed as numeric messages. On the other hand, when the pager is in the message tag display mode, the pager will parse the message tag identifier from each message received and display the canned message linked therewith in addition to displaying any numeric message transmitted together with the tag identifier.

In the tag message display mode, the pager will parse out some of the numeric digits received in a message and use them to interpret which canned message to display. The first two digits received may be parsed, for example. Thus, again referring to FIG. 4, a person who initiates a numeric page message and desires to send an emergency message for the pager user to call the telephone number "123-4567" would enter the numeric digits "0-0-1-2-3-4-5-6-7" on the telephone keypad. The pager, being previously set to the message tag display mode, would parse the first two digits "00" and recall the linked canned message and display a first page on the screen containing "EMERGENCY" followed by a second page containing the message "1234567" or alternatively, "001234567." If, on the other hand, the pager were not in the message tag display mode, but rather, was in the numeric display mode, the pager would simply display "001234567" upon receipt of the foregoing message.

Figure 5:
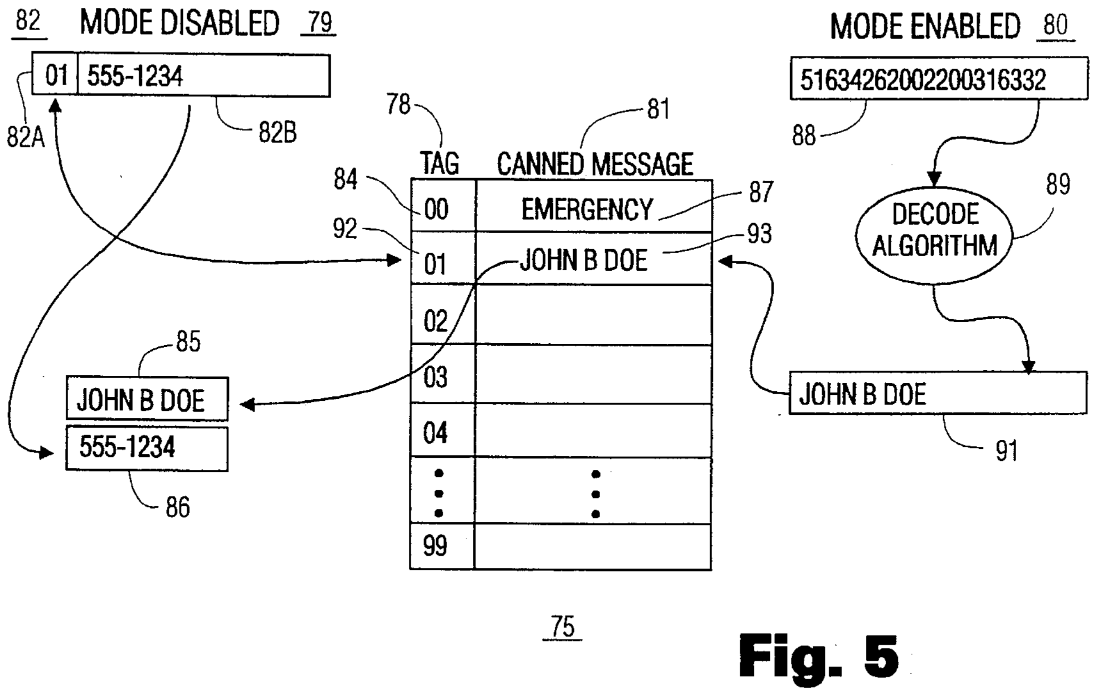
FIG. 5 is a message flow and memory diagram of the first embodiment.

Reference is now directed to FIG. 5 which is a message flow diagram and memory map of the canned message memory in the first embodiment of the present invention. Canned message memory 75 is allocated such that each canned message memory location 81 is linked with a message tag identifier 78. Some of the canned message memory locations, such as "01" 92, have no message stored in the linked canned message memory location 93, rather, they are programmable by the user of the pager. The quantity of canned message memory locations is variable, but may be 100, for example. Some of the canned message memory locations may be preprogrammed with commonly used canned messages to simplify the programming sequence for the end user, location "00" 84 containing the canned message "EMERGENCY" 87 for example. It is not important how many canned message memory locations are preprogrammed or unprogrammed in the preferred embodiment. It is only important that at least one canned message memory location be programmable by the end user. In fact, it is completely reasonable that the end user over-write pre-programmed messages to his own customized message. Such a memory scheme could be implemented in RAM, however EEPROM is preferable because of its a non-volatile attribute.

Figure 7:
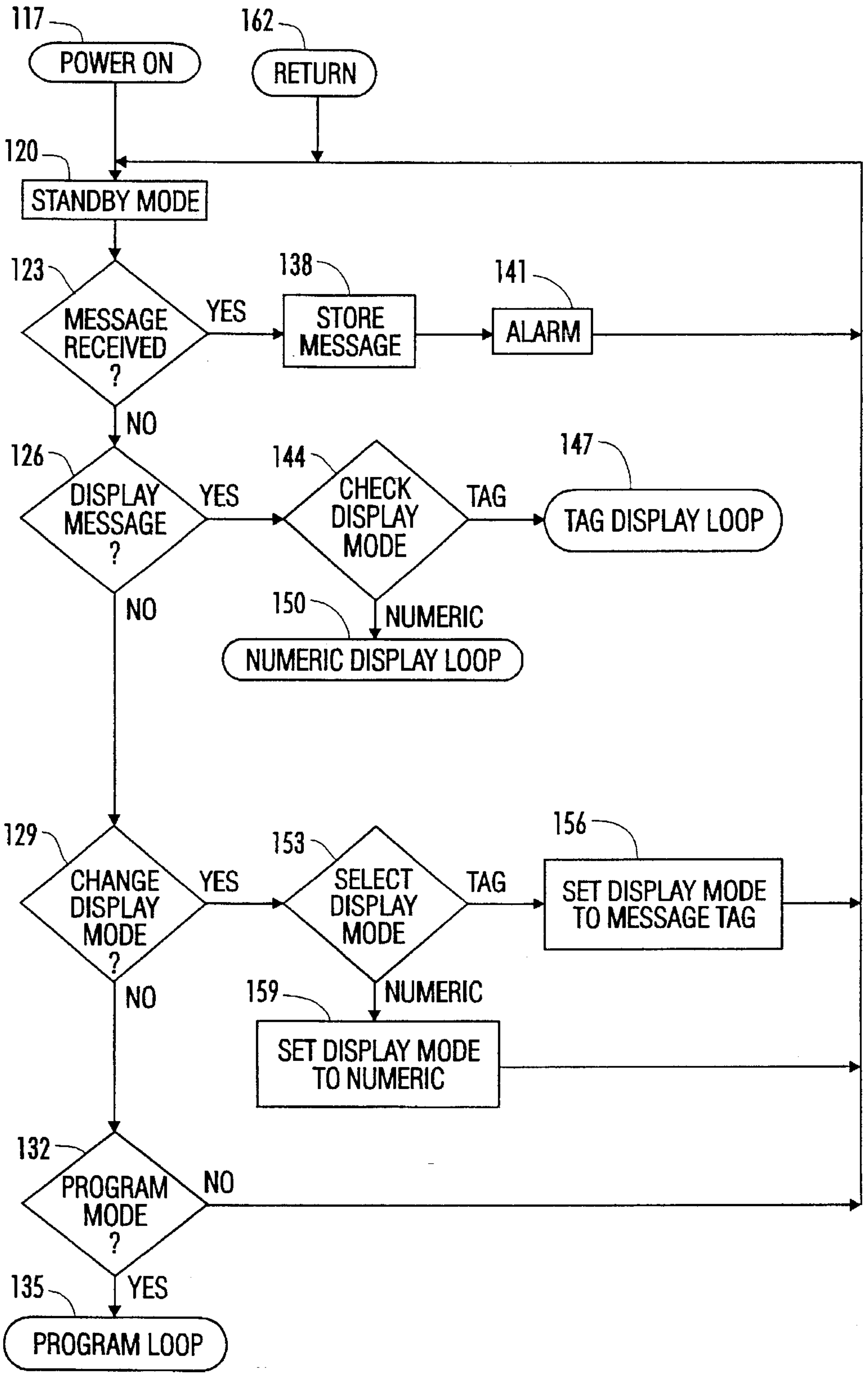
FIG. 7 is a flow chart of the standby mode loop in the first and second embodiments.

FIG. 7 also comprises a data flow diagram of the programming MODE DISABLED 79 and programming MODE ENABLED 80 modes of operation. It is during the MODE ENABLED mode of operation that the pager canned message memory 75 can be programmed with custom canned messages. It is during the MODE DISABLED 79 mode of operation that the pager recalls canned messages based on tag identifiers that are received in messages. A brief description of these modes of operation appears below. However, a more detailed analysis will follow during the discussion of the software flow diagrams.

During the MODE ENABLED 80 mode of operation, the canned message memory 75 is programmed. A tag identifier 78 is selected as the pager is placed in the programming MODE ENABLED mode of operation. For this example, tag identifier "01" 92 is selected. The pager then waits to receive a message, such as message 88. This message is generated using a DTMF telephone and accessing the automated paging terminal as described earlier. It is the coordination of the programming mode, selection of the tag identifier and transmission of a message which make this invention plausible. The message may be encoded numeric data, for example. Encoding and decoding schemes will be discussed later.

Upon receipt of the message 88, the CPU decodes the encoded message according to a decoding algorithm 89. The decoded message, "JOHN B DOE" in this example, is stored in a temporary memory location 91. This memory may be RAM, for example. If the pager receives subsequent messages while remaining in the programming mode, each successive message overwrites the existing message in temporary memory. This feature allows a message which was encoded incorrectly to be corrected before being transferred to the canned message memory 75.

Once the desired message has been received, the pager is switched from the MODE ENABLED 80 to the MODE DISABLED 79 mode of operation. As this change is made, the canned message stored in the temporary memory is transferred to the canned message memory at the storage location linked with the tag identifier selected earlier. In this example, "JOHN B DOE" 93 is stored at the location linked with tag identifier "01" 92. The pager is now ready to receive tagged message which will solicit the desired canned message.

In the MODE DISABLED 79 mode of operation, page messages 82 may be received from time to time. These messages are interpreted as having a tag identifier portion 82A and a data message portion 82B. In this example, the tag identifier portion 82A is "01" and the data message portion 82B is "555-1234". The CPU parses the tag identifier portion 82A and correlates the tag, "01" in this example, with an equal tag identifier in the canned message memory 92. The canned message linked with that tag identifier is recalled and displayed. In this example, tag identifier "01" 92 is linked with canned message "JOHN B DOE" 93. This message is displayed 85 together with the numeric data portion 82A on the display as 86. In this manner, a simple two digit numeric tag can solicit an alphanumeric message which was custom programmed by the pager user.

Reference is directed to FIG. 7 which is a flow chart of the software program of the standby mode loop in the first embodiment of the present invention. The program flow begins at step 117 when power is turned on. The CPU enters the standby mode in step 120. Within the standby mode, the CPU repeatedly tests for certain interrupts which cause some action to take place. This is referred to as the standby mode main loop. In step 123, the CPU checks for a received message. If a message is received, the message is stored at step 138 into an available page message memory location. Subsequently, the CPU activates an alarm in step 141. The alarm serves to alert the user that a page message has been received. Having activated the alarm, the CPU returns to the standby mode at step 120.

Figure 8:
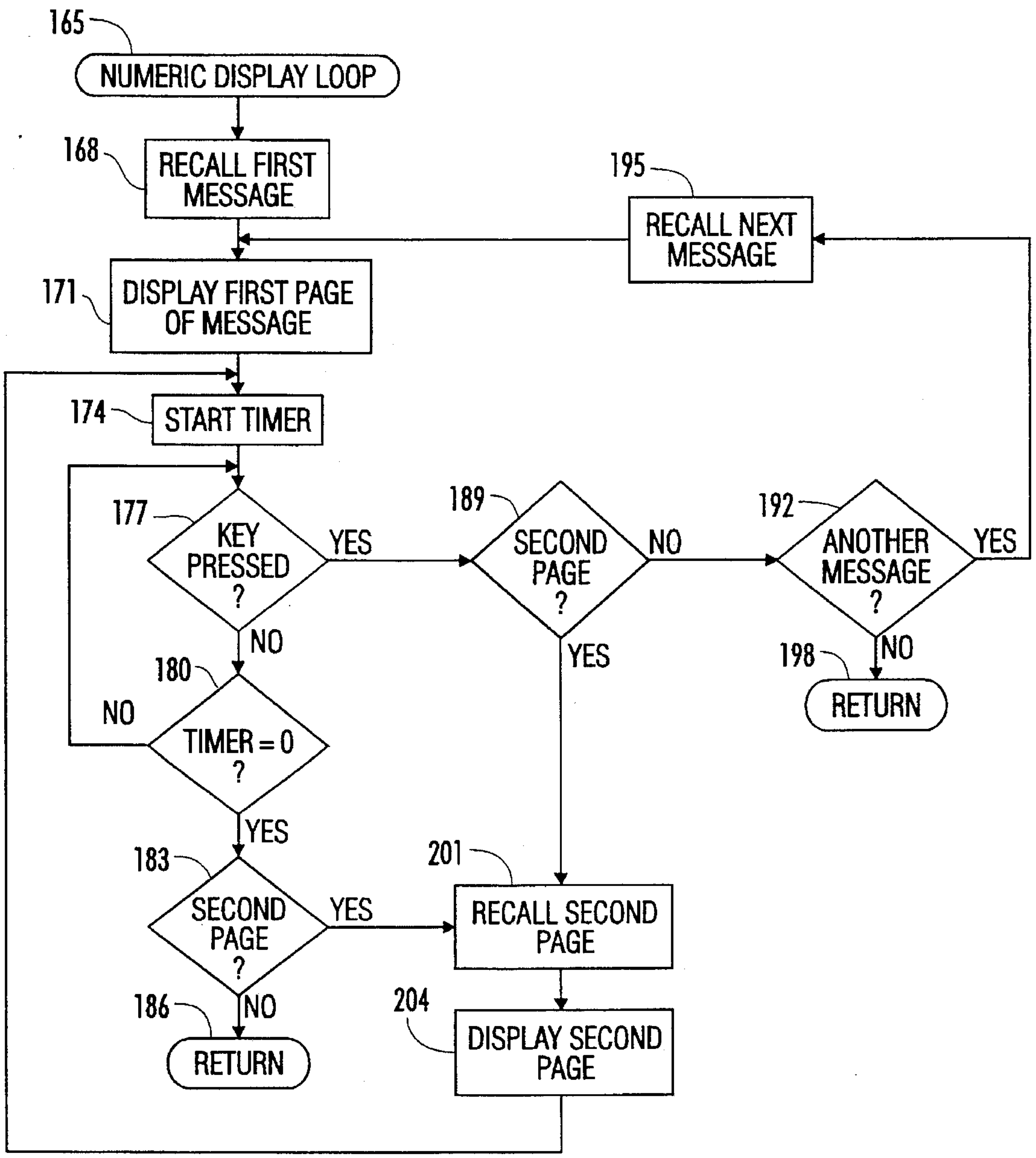
FIG. 8 is a flow chart of the numeric display loop in the first and second embodiments.
Figure 9:
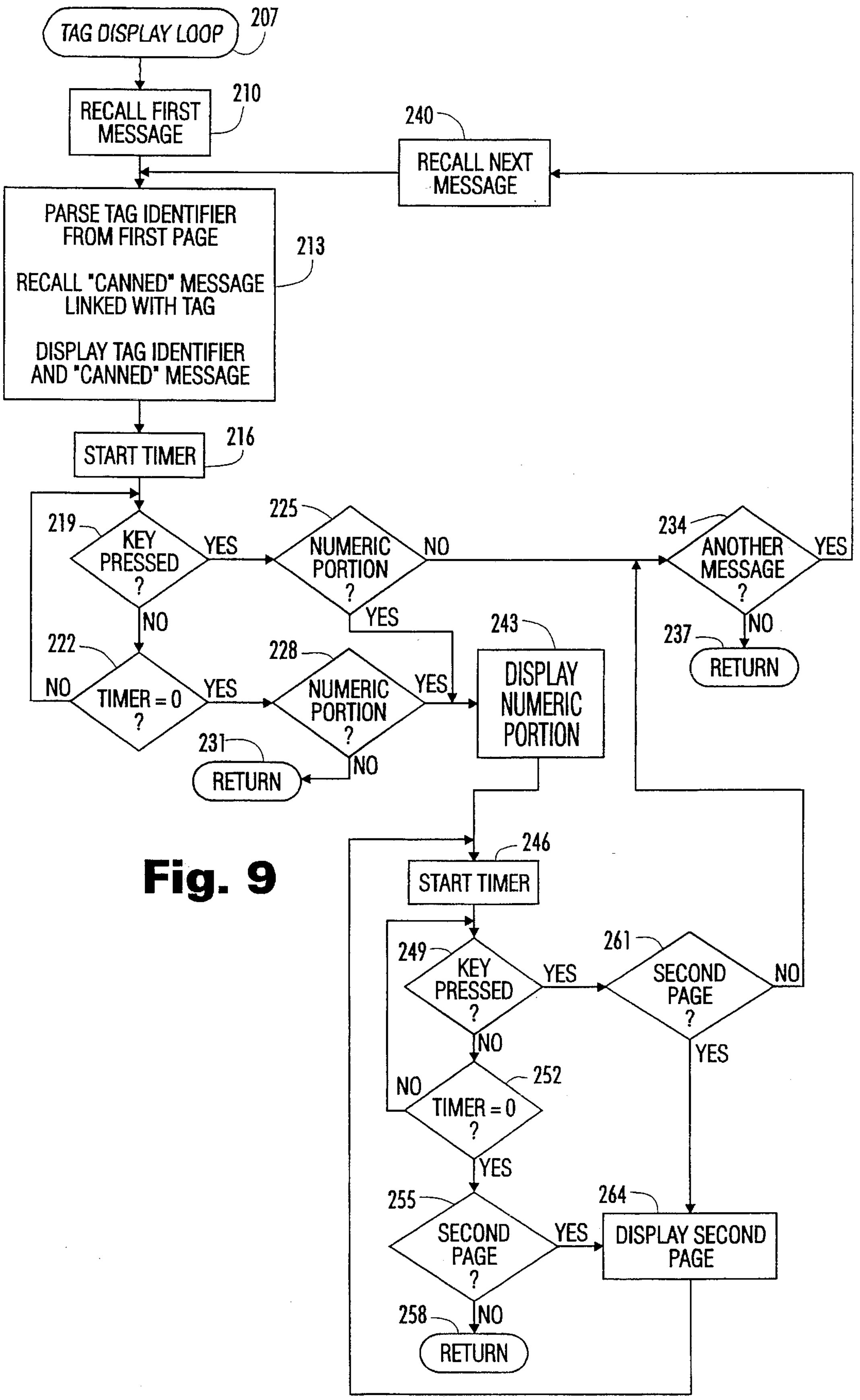
FIG. 9 is a flow chart of the tag message display loop in the first embodiment.

Alternatively, if a message is not received in step 123, the CPU continues check for other interrupts. Next, the pager checks to see if the user has requested that a stored message be displayed in step 126. If the user has requested that a message be displayed by pressing a key on the pager at step 126, the CPU checks for the current display mode setting in step 144. The display mode is selected in another step discussed hereinafter. The display mode can be set as either numeric display mode or message tag display mode. Continuing from step 144, if the numeric display mode has been selected, the pager goes to and executes the numeric display loop in step 150. The numeric display loop is shown in FIG. 8 and will be discussed below. On the other hand, if the message tag display mode has been selected, the pager executes the tag display loop in step 147. The tag display loop is shown in FIG. 9 and will be discussed below.

Returning to step 126, if the user had not requested that a message be displayed, the CPU continues through the standby mode main loop and checks to see if the user has requested a change in the display mode by pressing a key in step 129. If such a request has been made, the CPU waits for the display mode to be selected in step 153. Either the numeric display mode or the message tag display mode can be selected. If the numeric mode is selected, the CPU sets the display mode to numeric mode in step 159 and returns to the standby mode at step 120. On the other hand, if the message tag display mode is selected, the CPU sets the display mode to message tag mode in step 156 and then returns to the standby mode in step 120.

Returning to step 129, if no change in the display mode setting had been selected, the CPU goes to step 132 and checks to see if the program mode has been enabled. If the program mode has been enabled, the CPU executes the program loop in step 135. The program loop is shown if FIG. 10 and described in detail hereinafter. If, on the other hand, the program loop is not selected in step 132, the CPU returns to the standby mode at step 120. The CPU continues to scan through the standby mode main loop checking for inputs to the described functions and executes them as they are received.

FIG. 7 also comprises a return step 162 which is the re-entrant point from the various software loops which subsequently will be explained in detail. The return step returns the program execution to the standby mode at step 120 after each of the numeric display loop, tag display loop, and program loop are executed.

Reference is now directed to FIG. 8 which is a flow chart of the numeric display loop. This loop is entered from the standby mode main loop (FIG. 7, step 150) and it is within the numeric display loop that messages are display in numeric format. The numeric display loop is entered at step 165 at which point the CPU recalls the first message stored in the page message memory at step 168. The first display page of the message is directed to the display where it appears in numeric format 171. Next, the CPU starts a count down timer at step 174 which may be an eight second timer, for example, At this point, the CPU begins scanning to see if a key has been pressed at step 177. If no key is pressed, the CPU checks to see if the timer has decremented to zero at step 180. If the timer has not reached zero, then the CPU remains in the loop and repeatedly checks to see if a key has been pressed at step 177. If a key is pressed during this scan routine, the CPU checks to see if there is a second display page in the message at step 189. If there is no second display page, the CPU checks the page message memory at step 192 to see if there is another message to be displayed. If not, the CPU returns to the standby mode at step 198. If, on the other hand, there is another message to be displayed, the message is recalled at step 195 and subsequently displayed at step 171. Step 171 returns operation to the aforementioned timer scan loop.

Returning to step 180, if the timer has reached zero with no key having been pressed, the CPU checks for a second display page of the currently displayed message at step 183. If no second display page exists, the CPU returns to the standby mode at step 186. If, on the other hand, there is a second display page to the present message, the CPU recalls the second page at step 201. The recalled second display page is displayed at step 204 and the timer is again started at step 174.

The foregoing sequence allows the user of a pager to display a single message or to display multiple messages by pressing a key as they are reviewed. If the users wishes to accelerate the viewing of the messages, faster than the rate defined by the timer, the user can press a key at any time during the timer period and cause the CPU to recall and display the second display page or subsequent message as may be the case.

Reference is directed to FIG. 9 which is a flow diagram of the tag display loop. The tag display loop causes the pager to display canned messages linked with numeric tags in addition to the numeric information received in a page message. The tag display loop is entered from the standby mode main loop (FIG. 7, step 147) at step 207. At step 210, the CPU recalls the first page message from the page message memory. In step 213, the CPU parses the tag identifier from the numeric message recalled. The tag identifier may be the first two digits of the message, for example. The parsed tag is used as a pointer to an address in the canned message memory by virtue of the linking described herein before. The canned message linked with the tag is recalled and both the tag identifier and canned message are displayed, also in step 213. Alternatively, it is useful to display only the canned message and not the tag identifier.

Next, the CPU begins a count down timer at step 216. A timer loop begins at step 219 where the CPU scans to see if a key is been pressed. If no key is pressed, the CPU checks to see if the timer has reached zero in step 222. If the timer has not reached zero, the loop recirculates to again check if a key has been pressed at step 219. If a key is pressed, the CPU executes step 225 where it checks to see if the page message included a numeric portion.

If no numeric portion is found in step 225, the CPU checks for another page message in step 234. If no additional message is found, the CPU returns to the standby mode loop at step 237. If, on the other hand, another page message is found at step 234, the CPU recalls the page message at step 240 and returns to step 213 to parse, recall, and display the message as described above.

Returning to step 222, while in the timer scan loop, if the timer reaches zero, the CPU checks for a numeric portion of the page message at step 228. If no numeric portion exists, the CPU returns to the standby mode main loop at step 231. If, on the other hand, a numeric portion does exist, the numeric portion is displayed at step 243. Likewise at step 225, if a numeric portion is found after a key is pressed in step 219, the CPU displays the numeric portion at step 243.

From step 243, the CPU starts a count down timer at step 246 which may count down for eight seconds, for example. Next, the CPU begins a scan loop at step 249 by checking to see if a key has been pressed. If no key is pressed, the CPU checks to see if the timer equals zero at step 252. If the timer does not equal zero, the flow recirculates to step 249 and the keys are repeatedly scanned. If a key is pressed during the timer duration, the CPU checks for a second page at step 261. Alternatively, if the timer reaches zero at step 252 during the duration of the timer, the CPU checks for a second display page in the message at step 255. If no second display page is found, the CPU returns to the standby mode main loop at step 258. Referring to both steps 261 and 255, if a second display page is found at either step, the second display page of the present message is displayed at step 264. The CPU then returns to start the timer at step 246 and the loop, as described above, is restarted. At step 261, if no second display page is found, the CPU returns to step 234 to check for another message to display and proceeds as described above.

As described in the numerical display loop (FIG. 8) earlier, the tag display loop allows the user to display a single message with automatic timed display of the tag message, first, and second display pages of the message. Also, during the tag display loop, if the user desires to accelerate the rate of viewing or to view subsequent messages, a key can be pressed to accelerate the rate at which messages are viewed.

Figure 10:
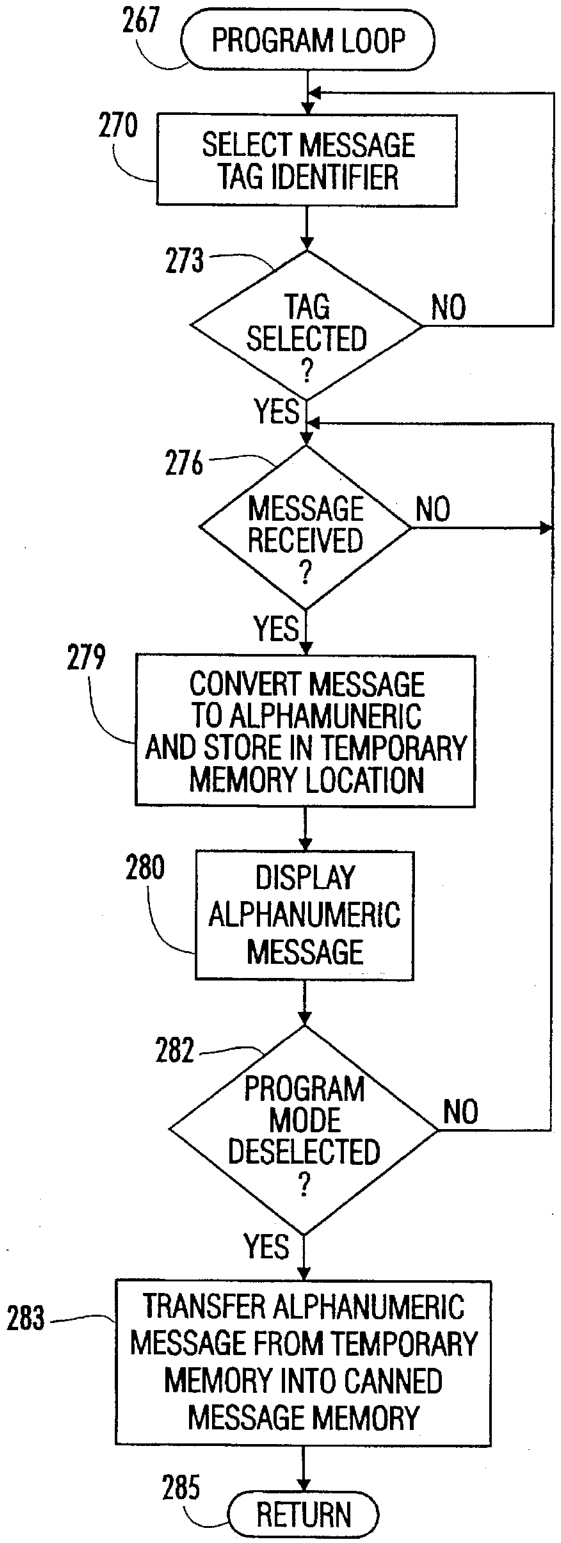
FIG. 10 is a flow chart of the program loop in the first embodiment.

Reference is directed to FIG. 10 which is a flow chart of the program loop. The program loop is accessed from the standby mode main loop (FIG. 7, step 135) described herein before. The program loop allows for the selection of a mode of operation wherein subsequently received page messages are stored in the canned message memory area and are referenced by a memory location tag identifier linked with the canned message memory location. The program loop begins at step 267. Next, a message tag identifier is selected through a series of keystrokes at step 270. The message tag identifier may be selected by scrolling through a list of all available message tag identifiers, for example. The CPU waits at step 273 for the selection to be made and loops back to step 270 until the identifier is selected. It is understood that this loop could be exited by a timer or such in the event that the user makes no message tag identifier selection. An identifier may be two numeric digits, for example. An identifier having been selected, the CPU waits at step 276 for a page message to be received by the receiver and decoded by the decoder. Assuming the message has the correct capcode, it is decoded, converted to alphanumeric format and stored in a temporary memory location at step 279. The alphanumeric conversion techniques are described hereinafter. The decoded message is displayed on the display at step 280. The purpose of displaying the decoded message is to allow the user to review the contents and make corrections, if necessary. Next, the CPU checks to see if the program mode has been deselected at step 282. If the program mode has not been deselected, the CPU returns to step 276 to again check if a message has been received. The CPU will continue to recirculate through this loop and received messages, each being stored in the temporary memory location until the program mode is deselected. Thus, the user can correct errors in the message transmitted by retransmitting a corrected message. Having received, decoded, and stored a correct "canned" message, the program mode is deselected at step 282. At step 283, the canned message stored in the temporary memory is stored in the canned message memory location linked with the tag identifier selected at step 270. The program loop is returned to the standby mode main loop at step 285.

The purpose of the foregoing program mode is to allow the user of a pager, incorporating the present invention, to program custom canned message into the pager in alphanumeric format. The programming of canned messages is accomplished by the user without intervention by the paging system operator or any modifications to a conventional POCSAG automated paging terminal. This programming is accomplished using a conventional DTMF telephone keypad.

Figure 1:
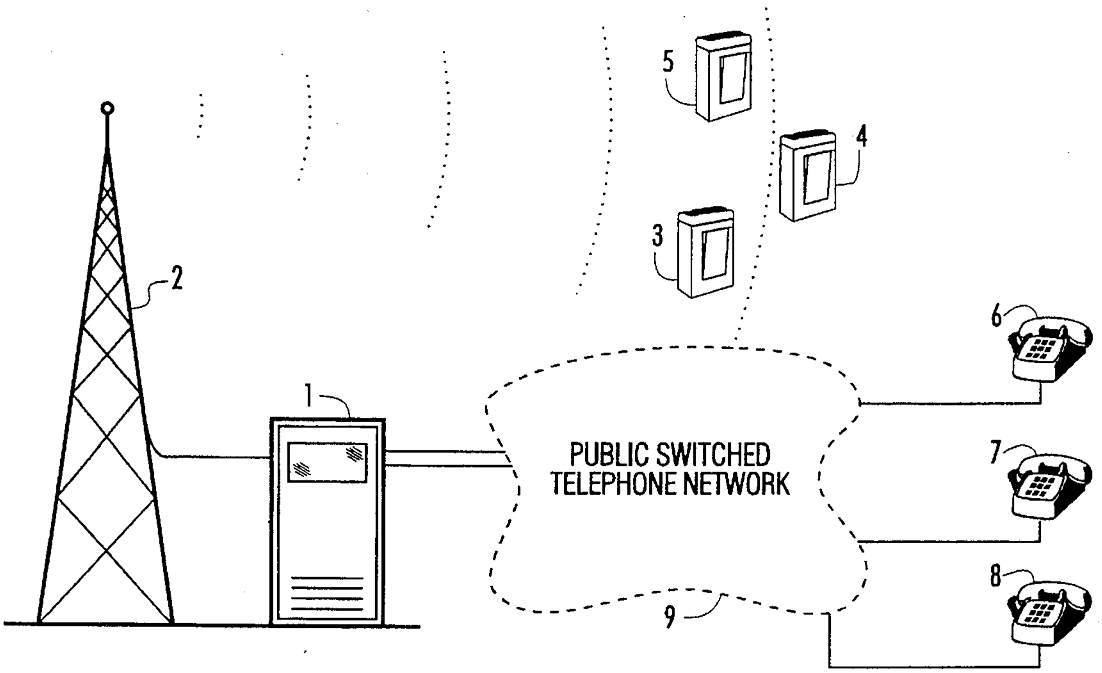
FIG. 1 is a system diagram illustrating the environment in which the first and second embodiments functions.
Figure 2:
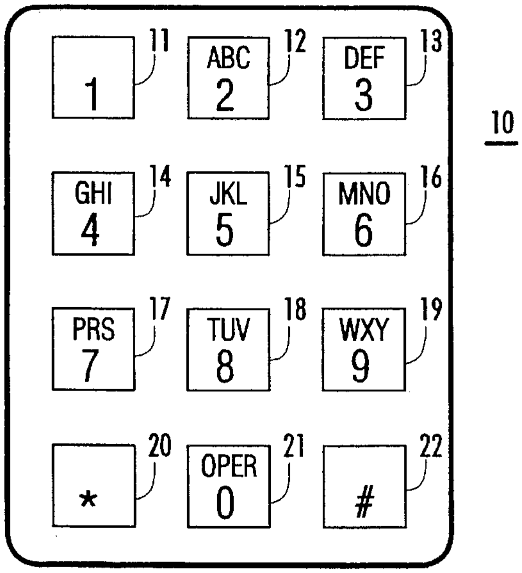
FIG. 2 illustrates a conventional telephone DTMF keypad.

Referring to FIG. 2, which is a diagram of a conventional telephone keypad 10, it can be seen that the telephone keypad 10 comprises twelve keys including "1" 11, "2" 12, "3" 13, "4" 14, "5" 15, "6" 16, "7" 17, "8" 18, "9" 19, "*" 20, "0" 21, and "#" 22 keys. All of the letters of the alphabet are represented except "Q" and "Z." The relationship between numerals and letters on a conventional telephone keypad is as follows in, Table 1:

TABLE 1

| KEY | NUMERAL | LETTERS |
|---|---|---|
| 1 | 1 | n/a |
| 2 | 2 | A, B, C |
| 3 | 3 | D, E, F |
| 4 | 4 | G, H, I |
| 5 | 5 | J, K, L |
| 6 | 6 | M, N, O |
| 7 | 7 | P, R, S |
| 8 | 8 | T, U, V |
| 9 | 9 | W, X, Y |
| * | n/a | n/a |
| 0 | 0 | "Oper" |
| # | n/a | n/a |

By using a multiple keystroke encoding scheme, every letter in the alphabet can be uniquely entered using a telephone keypad. Using such a code, the present invention is able to decipher an alphanumeric message by interpreting numeric information while at the same time, a user is able to define alphanumeric messages with relative ease because of the mnemonic relationship between the numerals and letters on the telephone keypad. Since the alphanumeric canned messages are only entered once and are used repeatedly, it is not objectionable to use such a scheme which requires two or more digits to encode each letter in the alphabet.

In the preferred embodiment, the alphabet is encoded by entering the numeric digit associated with the desired letter of the alphabet wherein the numeric digit is entered a number of times equal to the position of the letter on the numeric key counted from the left hand side. For example, to enter the letter "C", the digit "2" is pressed three times because the "C" is third from the left on the "2" key. Since the letters "Q" and "Z" do not appear on the telephone keypad, they are arbitrarily defined as the first and second positions on the "1" key. Hence, "Q" is accessed by pressing "1" once and "Z" is accessed by pressing "1" twice.

To avoid ambiguity when decoding the encoded message information, characters are delineated by pressing the zero key once and spaces can be added by pressing the zero key twice. The entire code is tabulated in Table 2, below, according to the preferred embodiment:

TABLE 2

| Letter | Keys |
|---|---|
| A | 2 |
| B | 2-2 |
| C | 2-2-2 |
| D | 3 |
| E | 3-3 |
| F | 3-3-3 |
| G | 4 |
| H | 4-4 |
| I | 4-4-4 |
| J | 5 |
| K | 5-5 |
| L | 5-5-5 |
| M | 6 |
| N | 6-6 |
| O | 6-6-6 |
| P | 7 |
| Q | 1 |
| R | 7-7 |
| S | 7-7-7 |
| T | 8 |
| U | 8-8 |
| V | 8-8-8 |
| W | 9 |
| X | 9-9 |
| Y | 9-9-9 |
| Z | 1-1 |
| Delin | 0 |
| Space | 0-0 |

Given the foregoing code, the name "JOHN DOE" would be encoded as:

5-0-6-6-6-0-4-4-0-6-6-0-0-3-0-6-6-6-0-3-3
J O H N[Spc] D O E

Alternatively, the letters of the alphabet could be specified on the telephone keypad by pressing the numeral on which the letter appears and the numeral whose value equals the position of the letter on the key as counted from the left hand side. The letter "C" would be accessed by pressing "2-3" for example, since the letter "C" is third from the left on the "2" key. This coding scheme allows for simple entry of numeric digits into the alphanumeric encoding scheme. Such a scheme is defined in Table 3, which follows:

TABLE 3

| Letter | Keys |
|---|---|
| A | 2-1 |
| B | 2-2 |
| C | 2-3 |
| D | 3-1 |
| E | 3-2 |
| F | 3-3 |
| G | 4-1 |
| H | 4-2 |
| I | 4-3 |
| J | 5-1 |
| K | 5-2 |
| L | 5-3 |
| M | 6-1 |
| N | 6-2 |
| O | 6-3 |
| P | 7-1 |
| Q | 1-1 |
| R | 7-2 |
| S | 7-3 |
| T | 8-1 |
| U | 8-2 |

TABLE 3-continued

| Letter | Keys |
|---|---|
| V | 8-3 |
| W | 9-1 |
| X | 9-2 |
| Y | 9-3 |
| Z | 1-2 |
| 0 | n/a |
| 1 | 1-0 |
| 2 | 2-0 |
| 3 | 3-0 |
| 4 | 4-0 |
| 5 | 5-0 |
| 6 | 6-0 |
| 7 | 7-0 |
| 8 | 8-0 |
| 9 | 9-0 |
| * | *-0 |
| # | #-0 |
| Delin | n/a |
| Space | 0-0 |

In the foregoing scheme, numerals are coded as the key on which they appear and a zero. Likewise, the "*" and "#" characters are encoded by pressing the respective key and a zero. No delineation is needed since the received message is parsed two digits at a time. A space is entered by entering the digits "0-0". The letter "O" is not distinctly supported, however, the numeral zero would be acceptable for pager messages needing the letter "O".

Given the foregoing code, the name "JOHN DOE" would be encoded as:

5-1-6-3-4-2-6-2-0-0-3-1-6-3-3-2
J O H N [Spc] D O E

In the second embodiment of the present invention, the tag identifier is also programmable by the end user. This additional capability to the first embodiment allows the custom definition of the tag identifier. This can provide for easier memorization of the tag identifier needed to solicit a particular canned message from the pager memory. The numerals "911" could solicit the canned message "EMERGENCY" for example. Also, the letter-to-numeral correspondence of the telephone keypad could be used as a mnemonic aide in recalling tag identifiers. As discussed earlier the name "JOE" could be entered by pressing the numerals "563" on the telephone keypad, see FIG. 2.

Figure 6:
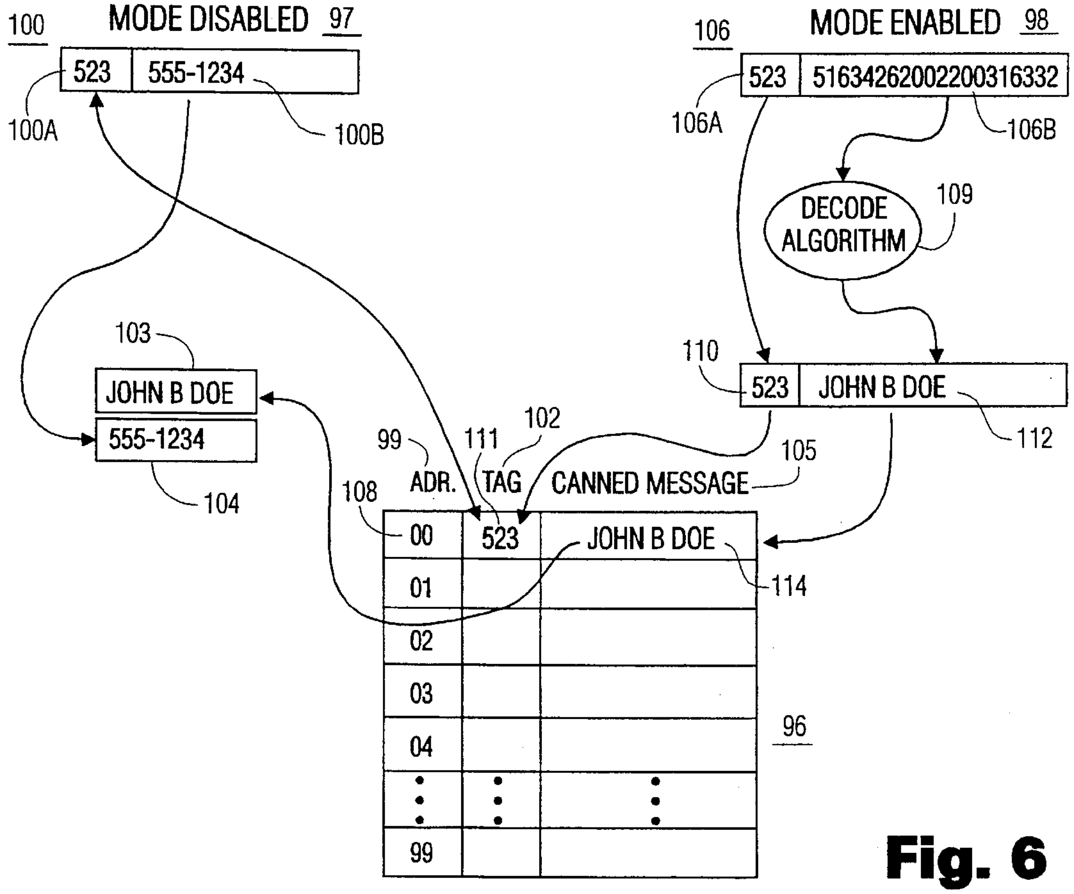
FIG. 6 is a message flow and memory diagram of the second embodiment.

In the second embodiment of the present invention, the canned message memory structure is modified to accept programmable message tag identifiers. Reference is directed to FIG. 6, which is a message flow diagram and memory map 96 of the canned message storage area in the second preferred embodiment. The canned message memory 96 can be embodied in any random access memory, however, EEPROM is preferable because of its non-volatile attribute. The canned message memory comprises pairs of linked memory locations referred to as tag memory locations 102 and canned message memory locations 105. In FIG. 6, an address column 99 is shown as a reference to the storage location address in the physical memory. The storage address can be relative or absolute which ever is most convenient in the design. The storage address is used to select a particular linked memory pair for programming or reprogramming. It is equally satisfactory to scroll through a list of canned message storage locations as a means of selecting the particular location to be programmed. In any case, a linked pair of canned message storage locations are identified by a storage address. The storage address references may range from "00" to "99" 108 for example. Each linked pair of memory locations may contain one each of a tag identifier 111 and a canned message 114 which are programmable by the end user, or, may be pre-programmed by the manufacturer or service provider for convenience to the end user.

FIG. 6 also comprises a message flow diagram for the programming MODE ENABLED 98 and MODE DISABLED 97 modes of operation. It is during the MODE ENABLED 98 mode of operation in which the user can program custom canned messages. The programming MODE ENABLED 98 is enabled by a series of keystrokes. At the same time, the user selects a particular pair of linked memory locations 111 and 114 by selecting a particular address 99. In the following example, address "00" 108 has been selected. A message is created 106 and transmitted to the pager as described earlier. Upon receipt, the CPU interprets the message as having a tag identifier portion 106A and a numeric data portion 106B. The tag identifier portion is stored in a temporary memory 110 and the numeric data portion is decoded into alphanumeric data according to a decode algorithm 109 and stored in a temporary memory 112 as alphanumeric data, a canned message. The tag identifier portion 110 and temporary canned message 112 are displayed for review by the user. If the user desires, another message can be transmitted and will subsequently overwrite the present tag identifier portion and temporary canned message in the temporary memory. This allows for the correction of messages transmitted in error.

Once the desire message is stored in the temporary memory, the programing mode is switched to the MODE DISABLED 97 mode of operation. At this time, the tag identifier portion 110 and canned message 112 are transferred from the temporary memory into a pair of linked storage locations in the canned message memory 96 as identified by the storage address 108 selected earlier. In this example, the tag identifier "523" 111 is stored in a tag storage location 102 and the canned message "JOHN B DOE"112 is stored in a canned message memory 105 at location 114, both stored according to the storage address "00" 108.

Considering now the MODE DISABLED 97 mode of operation, the pager is ready to receive a message 100. The message 100 is parsed into a tag identifier portion 100A and a data message portion 100B. The CPU compares the tag identifier portion with all the tag identifiers stored in the canned message memory. If a match is found, the CPU recalls the canned message linked with the matched tag identifier and displays it on the display 103. In this example, the message contained the tag identifier portion "523" 100A which matched with tag identifier "523" 111 in the canned message memory. Therefore, the canned message "JOHN B DOE" 114 was recalled and displayed 103. Additionally, the CPU will display the data message portion 100B of the received message. The foregoing process will be more clearly described in the following software flow descriptions.

Considering now, the second embodiment of the present invention, the operation and control of the pager by the CPU is the same as in the first embodiment, in all program loops except for the tag display loop and program loop. Therefore, in the second embodiment of the present invention, the standby mode (FIG. 7) and numeric display loop (FIG. 8) remain unchanged. The tag display loop (FIG. 9 in the first embodiment) is now referenced in FIG. 11 in the second embodiment. Likewise, the program loop (FIG. 10 in the first embodiment) is referenced in FIG. 12 in the second embodiment.

Figure 11:
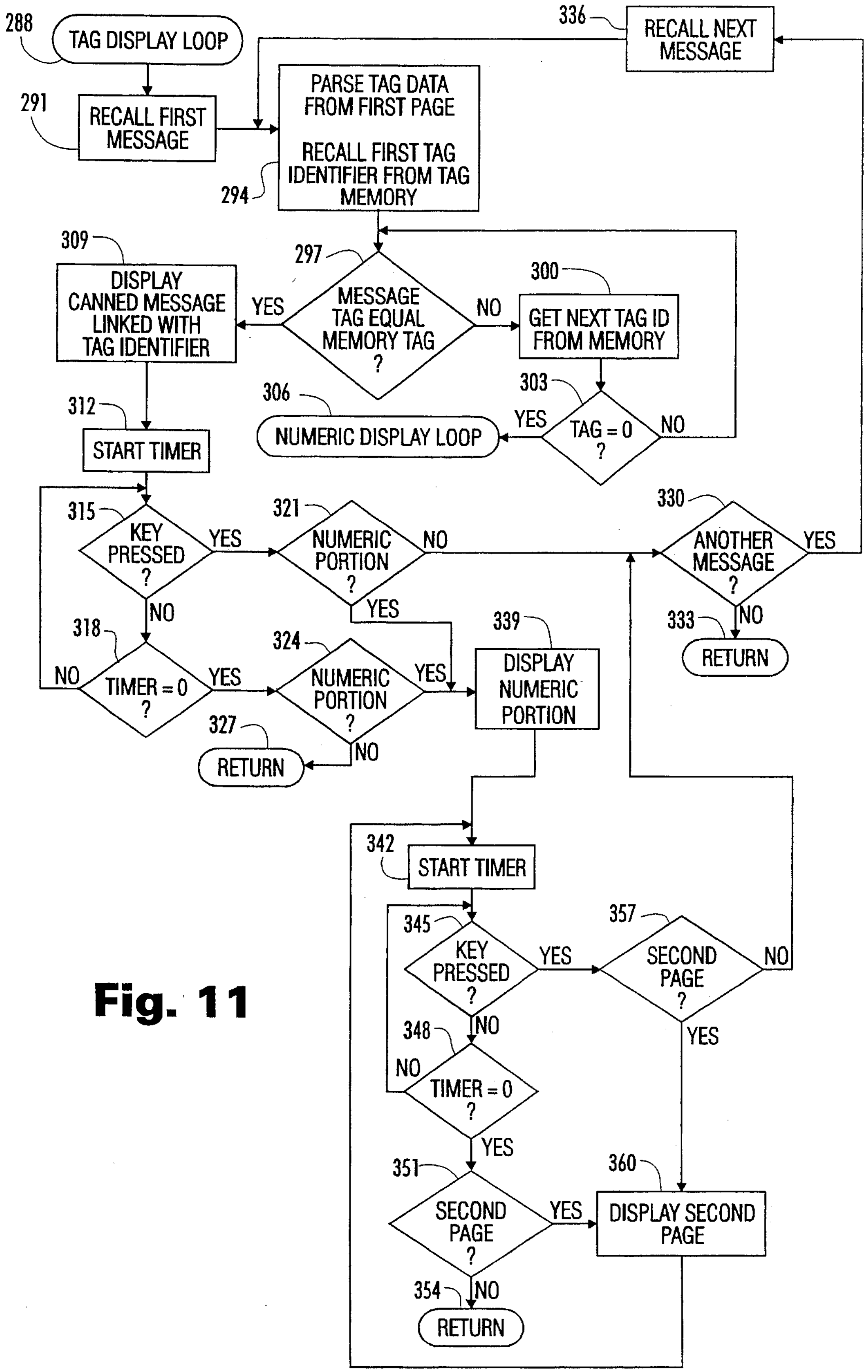
FIG. 11 is a flow chart of the tag message display loop in the second embodiment.

Reference is now directed to FIG. 11 which is a flow chart of the tag display loop in the second embodiment of the present invention. The tag display loop is entered from the standby mode main loop at step 147 in FIG. 7 to step 288 in FIG. 11. The CPU recalls the first page message from the page message memory in step 291. Next, in step 294, the CPU parses the tag identifier portion of the data from the numeric data portion of the page message just recalled. Then, the CPU recalls the first tag identifier from the canned message memory. The two tag identifier values are compared at step 297. If the values are not equal, the CPU recalls the next tag identifier from the canned message memory at step 300. In step 303, the value of the tag is tested for equality with zero. The purpose of this test is to determine if the recalled value is an actual tag or an empty memory location. If the tag equals zero, then there is no matching tag for the message to be displayed and the CPU reverts to the numeric display loop at step 306. If, on the other hand, the tag value recalled from the canned message memory does not equal zero at step 303, the CPU returns to step 297 to test if the recalled value equals the value of the message to be displayed. The foregoing loop causes a scanning action which tests each canned message tag identifier value for equality to the tag value of the message to be displayed. If no match is found, the CPU will revert to the numeric display mode. This sequence allows for the random storage of any canned message and linked tag identifier within the canned message memory area and the reliable recollection thereof.

Returning now to step 297, if the CPU finds that the tag value of the canned message tag equals the tag value of the message to be display, then the CPU proceeds to step 309 where the canned message linked with the present tag value is recalled from memory and displayed on the display. Next, the CPU begins a count down timer at step 312. A timer loop begins at step 315 where the CPU scans to see if a key has been pressed. If no key is pressed, the CPU checks to see if the timer has reached zero in step 318. If the timer has not reached zero, the loop recirculates to again check if a key has been pressed at step 315. If a key is pressed, the CPU executes step 321 where it checks to see if the message has also parsed a numeric portion from the originally recalled page message.

If no numeric portion is found in step 321, the CPU checks for another page message in step 330. If no additional message is found, the CPU returns to the standby mode loop at step 333. If, on the other hand, another page message is found at step 330, the CPU recalls the message at step 336 and returns to step 294 to parse, recall, and display the message as described above.

Returning to step 318, while in the timer scan loop, if the timer reaches zero, the CPU checks for a numeric portion of the page message at step 324. If no numeric portion exists, the CPU returns to the standby mode main loop at step 327. If, on the other hand, a numeric portion does exist, the numeric portion is displayed at step 339. Likewise at step 321, if a numeric portion is found after a key is pressed in step 315, the CPU displays the numeric portion at step 339.

From step 339, the CPU starts a count down timer at step 342 which may count down for eight seconds, for example. Next, the CPU begins a scan loop at step 345 by checking to see if a key has been pressed. If not, the CPU checks to see if the timer equals zero at step 348. If the timer does not equal zero, the flow recirculates to step 345 and the keys are repeatedly scanned. If a key is pressed during the timer duration, the CPU checks for a second display page at step 357. Alternatively, if the timer reaches zero at step 348 during the duration of the timer, the CPU checks for a second display page in the message at step 351. If no second display page is found, the CPU returns to the standby mode main loop at step 354. Referring to both steps 357 and 351, if a second display page is found at either step, the second page of the present message is displayed at step 360. The CPU then returns to start the timer at step 342 and the loop, as described above, is restarted. At step 357, if no second display page is found, the CPU returns to step 330 to check for another message to display and proceeds as described above.

As described in the numerical display loop (FIG. 8) earlier, the tag display loop allows the user to display a single message with automatic timed display of the tag message, first and second display pages of the message. Also, during the tag display loop, if the user desire to accelerate the rate of viewing or to view subsequent messages, a key can be pressed to accelerate the rate a which messages are displayed.

Figure 12:
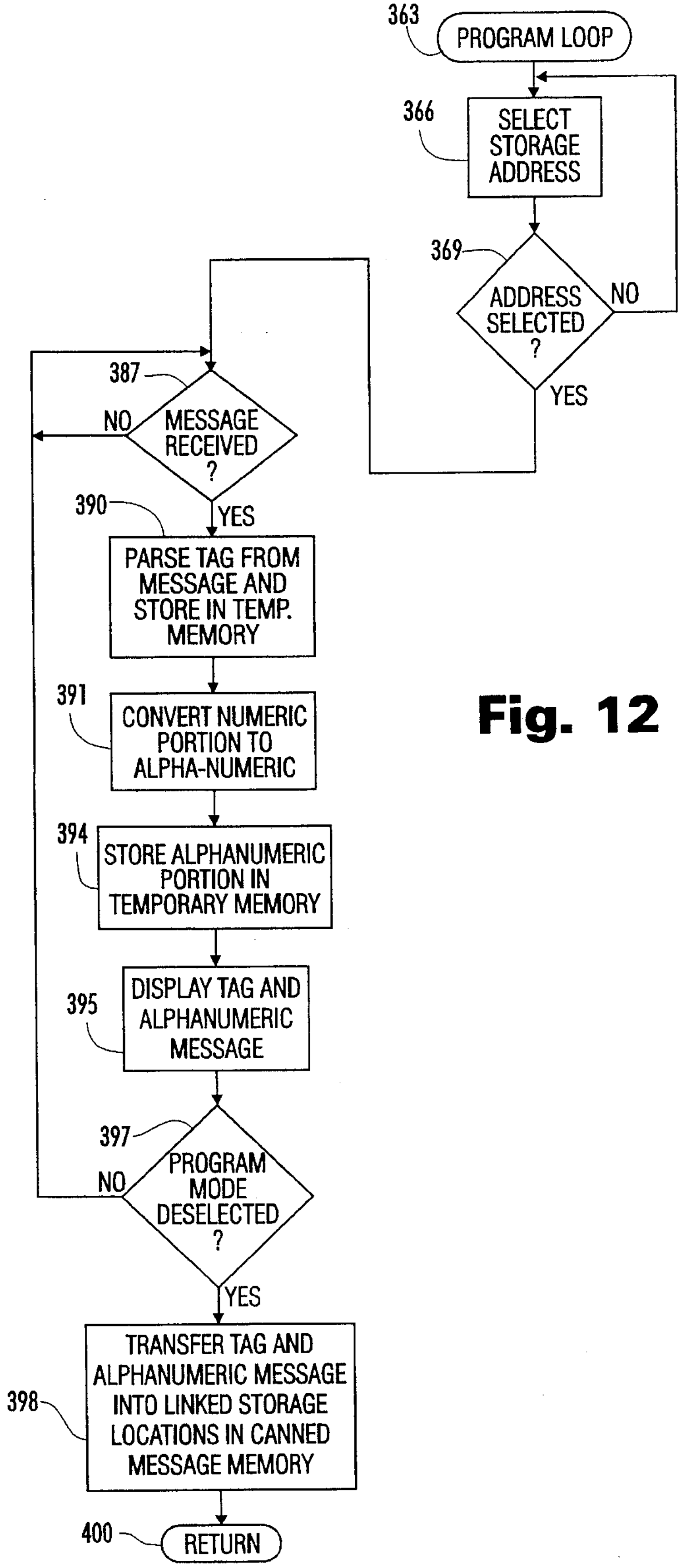
FIG. 12 is a flow chart of the program loop in the second embodiment.

Reference is now directed to FIG. 12 which is a flow chart of the program loop of the second embodiment of the present invention. This loop replaces the program loop in FIG. 10 of the first embodiment. The program loop of the second embodiment is entered from step 135 of the standby mode main loop in FIG. 7 to step 363 in FIG. 12.

The user selects one of the several storage addresses at step 366. For this embodiment, a two digit numerical address is used and it is selected by scrolling through a list of available addresses. It is to be understood that other means for selecting the storage address could be used. For example, the user could simply scroll through a list of previously stored canned messages and stop at a message whose location is to be overwritten by the new canned message to be programmed. Alternatively, the CPU could manage a pool of memory whereby the CPU would automatically detect available memory and assign a storage address without an actual selection being made by the user.

The CPU checks to see if a address selection has been made at step 369. If a selection has not been made, the flow recirculates to step 366 in order to allow a selection to be made. On the other hand, if a selection is made, at step 369, the flow continues to step 387 to wait for a message to be received. It is well known that the loop created between the selection step 366 and the question step 369 could form an infinite loop in the software if no selection is made. It is common to incorporate a timer within such a loop to cause an exit from the loop in the event that no selection is made within a given period of time. Such detail is omitted from the flow chart for clarity.

Returning to step 387, the CPU tests to see if a message has been received. If no message has been received, the flow recirculates through step 387, waiting for a message to be received. The message would be initiated by the user, utilizing a DTMF telephone as described earlier. When a message is received at step 387, the CPU proceeds to step 390 where a tag portion is parsed from the message and stored in a temporary memory. The tag portion may be the first three numeric characters of the message, for example. The remaining numeric characters of the message are converted to alphanumeric characters according to a decoding algorithm at step 391. This data is a canned message. The encoding and decoding algorithms used here are the same as were discussed earlier.

At step 394, the canned message is stored in a temporary memory together with the tag identifier portion. At step 395, the tag identifier portion and canned message are displayed for review by the user. The reason for this step is to allow the user to verify that the message was correctly encoded, transmitted, and decoded. If the message is fount to be in error, it can be corrected by initiating another message and overwriting the message presently residing in the temporary memory. This is accomplished at step 397 where the CPU tests to see if the program mode has been deselected. If the mode has not been deselected, the flow recirculates to step 387 to allow another message to be received, thus allowing the present message in the temporary memory to be overwritten. Returning to step 397, if the user is satisfied with the present message, the program mode is deselected and the flow goes to step 398. At step 398, the tag identifier portion and canned message are transferred from the temporary memory into the canned message memory and stored in a linked pair of storage locations according to the storage address selected at step 366. That particular canned message now being available for use in future messages.

Finally, the CPU returns to the standby mode main loop at step 400 which returns to step 162 in FIG. 7.

While the foregoing specification and drawings enable those skilled in this and related arts to practice the present invention in accordance with the preferred embodiment, the claimed invention encompasses a broader scope. Further modifications and improvements may occur which will make obvious manifold variants of the present invention. The claims appended hereunto are intended to read upon all such variants.

What is claimed is:

1. A method of utilizing canned messages in a pager, the pager adapted to receive, store, recall, and display messages, and wherein said messages comprise numeric data, comprising the steps of:

specifying a tag identifier, enabling a mode of operation, by the end user of the pager, wherein subsequently received messages, that are received by radio transmission, are stored in a canned message memory at a message storage location specified by said tag identifier, as a canned message, disabling said mode of operation, parsing subsequently received messages into a tag identifier portion and a data message portion, decoding said numeric data messages into alphanumeric data according to a decoding algorithm, and wherein said decoding algorithm is defined by the following table, and is encoded by entering digits on a telephone by pressing keys:

| Letter | Keys |
|---|---|
| A | 2 |
| B | 2-2 |
| C | 2-2-2 |
| D | 3 |
| E | 3-3 |
| F | 3-3-3 |
| G | 4 |
| H | 4-4 |
| I | 4-4-4 |
| J | 5 |
| K | 5-5 |
| L | 5-5-5 |
| M | 6 |
| N | 6-6 |
| O | 6-6-6 |
| P | 7 |
| Q | 1 |
| R | 7-7 |
| S | 7-7-7 |

-continued

| Letter | Keys |
|---|---|
| T | 8 |
| U | 8-8 |
| V | 8-8-8 |
| W | 9 |
| X | 9-9 |
| Y | 9-9-9 |
| Z | 1-1 |
| Delin | 0 |
| Space | 0-0 |

recalling said canned message from said canned message memory at a message storage location specified by said tag identifier portion of said received message.

2. A method of utilizing canned messages in a pager, the pager adapted to receive, store, recall, and display messages, and wherein said messages comprise numeric data, comprising the steps of:

specifying a tag identifier, enabling a mode of operation, by the end user of the pager, wherein subsequently received messages, that are received by radio transmission, are stored in a canned message memory at a message storage location specified by said tag identifier, as a canned message, disabling said mode of operation, parsing subsequently received messages into a tag identifier portion and a data message portion, decoding said numeric data messages into alphanumeric data according to a decoding algorithm, and wherein said decoding algorithm is defined by the following table, and is encoded by entering digits on a telephone by pressing keys:

| Letter | Keys |
|---|---|
| A | 2-1 |
| B | 2-2 |
| C | 2-3 |
| D | 3-1 |
| E | 3-2 |
| F | 3-3 |
| G | 4-1 |
| H | 4-2 |
| I | 4-3 |
| J | 5-1 |
| K | 5-2 |
| L | 5-3 |
| M | 6-1 |
| N | 6-2 |
| O | 6-3 |
| P | 7-1 |
| Q | 1-1 |
| R | 7-2 |
| S | 7-3 |
| T | 8-1 |
| U | 8-2 |
| V | 8-3 |
| W | 9-1 |
| X | 9-2 |
| Y | 9-3 |
| Z | 1-2 |
| 0 | n/a |
| 1 | 1-0 |
| 2 | 2-0 |
| 3 | 3-0 |
| 4 | 4-0 |
| 5 | 5-0 |
| 6 | 6-0 |
| 7 | 7-0 |
| 8 | 8-0 |
| 9 | 9-0 |

-continued

| Letter | Keys |
|---|---|
| * | *-0 |
| # | #-0 |
| Delin | n/a |
| Space | 0-0 |

recalling said canned message from said canned message memory at a message storage location specified by said tag identifier portion of said received message.

3. A pager, comprising:

a receiver for selectively receiving messages;

a memory having a plurality of storage locations for storing canned messages and at least one of said plurality of storage locations having a tag identifier linked therewith, an actuator, actuatable by the end user of the pager, for specifying one of said tag identifiers and enabling a mode of operation of said pager, and a controller coupled to said receiver, said memory, and said actuator, such that when said actuator enables said mode of operation, the next received message(s), that is received by radio transmission, is interpreted as a numeric data message and is decoded into a canned message according to a decoding algorithm, and said canned message is stored in the one of said plurality of storage locations linked with the one of said tag identifiers specified by said actuator, and wherein said decoding algorithm converts said numeric data message into said canned message, comprising alphanumeric data, according to the following conversion table:

| Alpha-numeric data | Numeric data |
|---|---|
| A | 2 |
| B | 2-2 |
| C | 2-2-2 |
| D | 3 |
| E | 3-3 |
| F | 3-3-3 |
| G | 4 |
| H | 4-4 |
| I | 4-4-4 |
| J | 5 |
| K | 5-5 |
| L | 5-5-5 |
| M | 6 |
| N | 6-6 |
| O | 6-6-6 |
| P | 7 |
| Q | 1 |
| R | 7-7 |
| S | 7-7-7 |
| T | 8 |
| U | 8-8 |
| V | 8-8-8 |
| W | 9 |
| X | 9-9 |
| Y | 9-9-9 |
| Z | 1-1 |
| Delin | 0 |
| Space | 0-0 |

and said numeric data are delineated by the "Delin" character "0" from the above table.

4. A pager, comprising:

a receiver for selectively receiving messages;

a memory having a plurality of storage locations for storing canned messages and at least one of said plurality of storage locations having a tag identifier linked therewith, an actuator, actuatable by the end user of the pager, for specifying one of said tag identifiers and enabling a mode of operation of said pager, and a controller coupled to said receiver, said memory, and said actuator, such that when said actuator enables said mode of operation, the next received message(s), that is received by radio transmission, is interpreted as a numeric data message and is decoded into a canned message according to a decoding algorithm, and said canned message is stored in the one of said plurality of storage locations linked with the one of said tag identifiers specified by said actuator, and wherein said decoding algorithm converts said numeric data message into said canned message, comprising alphanumeric data, according to the following conversion table:

| Alpha-numeric data | Numeric data |
|---|---|
| A | 2-1 |
| B | 2-2 |
| C | 2-3 |
| D | 3-1 |
| E | 3-2 |
| F | 3-3 |
| G | 4-1 |
| H | 4-2 |
| I | 4-3 |
| J | 5-1 |
| K | 5-2 |
| L | 5-3 |
| M | 6-1 |
| N | 6-2 |
| O | 6-3 |
| P | 7-1 |
| Q | 1-1 |
| R | 7-2 |
| S | 7-3 |
| T | 8-1 |
| U | 8-2 |
| V | 8-3 |
| W | 9-1 |
| X | 9-2 |
| Y | 9-3 |
| Z | 1-2 |
| 0 | n/a |
| 1 | 1-0 |
| 2 | 2-0 |
| 3 | 3-0 |
| 4 | 4-0 |
| 5 | 5-0 |
| 6 | 6-0 |
| 7 | 7-0 |
| 8 | 8-0 |
| 9 | 9-0 |
| * | *-0 |
| # | #-0 |
| Delin | n/a |
| Space | 0-0 |

and said numeric data are delineated as every two of said numeric data.

5. A method of utilizing canned messages in a pager, the pager adapted to receive, store, recall, and display messages, and the pager further adapted to receive messages transmitted from an automated paging terminal which accepts message transmission requests from the public switched telephone network wherein standard DTMF telephones are used as message input terminals, comprising the steps of:

specifying a tag identifier, enabling a mode of operation in the pager wherein subsequently received messages are stored in a canned message memory at a message storage location identified by said tag identifier, accessing the automated paging terminal via the public switched telephone network using a standard DTMF telephone, entering a message on a DTMF telephone keypad, transmitting, by the automated paging terminal, said message entered on the DTMF telephone keypad, receiving of said transmitted message by the pager, storing said message in said canned message memory at a message storage location identified by said tag identifier, as a canned message, disabling said mode of operation, subsequently receiving messages from said automated paging terminal, parsing said received messages into a tag identifier portion and a data message portion, and recalling said canned message from said canned message memory at a message storage location identified by said tag identifier portion of said received message, displaying said canned message and said data message portion on a display.

6. A method of utilizing canned messages in a pager, the pager adapted to receive, store, recall, and display messages, and the pager further adapted to received messages transmitted from an automated paging terminal which accepts message transmission requests from the public switched telephone network wherein standard DTMF telephones are used as message input terminals, comprising the steps of:

specifying a tag identifier, enabling a mode of operation in the pager wherein subsequently received messages are stored in a temporary memory, accessing the automated paging terminal via the public switched telephone network using a standard DTMF telephone, entering numeric data on a DTMF telephone keypad according to an encoding algorithm related to the placement of alphabetic characters on the DTMF telephone keypad wherein alphanumeric data is thereby encoded as a numeric data message, transmitting, by the automated paging terminal, said numeric data message, receiving of said transmitted numeric data message by the pager, decoding into alphanumeric data said transmitted numeric data message according to said algorithm by the pager, storing said alphanumeric data in said temporary memory, displaying said alphanumeric data on a display, repeating said accessing, entering, transmitting, receiving, and displaying steps until a desired message is displayed, disabling said mode of operation, transferring said alphanumeric data from said temporary memory into a canned message memory at a message storage location specified by said tag identifier, as a canned data message, subsequently receiving messages from said automated paging terminal, parsing said received messages into a tag identifier portion and a data message portion, and recalling said canned message from said canned message memory at a message storage location specified by said tag identifier portion of said received message, displaying said canned message on a first page of said display, and displaying said data message portion on a second page of said display.

7. A method of utilizing messages in a pager, the pager adapted to receive, store, and recall messages, comprising the steps of:

selecting a storage address, enabling a mode of operation, by the end user of the pager, wherein subsequently received messages, that are received by radio transmission, are parsed into a tag identifier portion and a canned message portion, and said tag identifier portion and said canned message portion being stored in a canned message memory at a linked pair of memory storage locations specified by said storage address, disabling said mode of operation, and recalling said canned message stored in said canned message memory from said linked memory storage location upon receipt of a tag identifier portion matching said tag identifier stored in said canned message memory at a storage location linked with said canned message, in a subsequently received message.

8. The method of claim 7, further comprising the step of:

displaying, on a display, said canned message and said data message portion.

9. The method of claim 8, wherein:

said canned message is displayed on a first page of said display and said data message portion is displayed on a second page of said display.

10. The method of claim 7, wherein said messages comprise numeric data, and further comprising the step of:

decoding said numeric data messages into alphanumeric data according to a decoding algorithm.

11. The method of claim 10, wherein said decoding algorithm is defined by the following table, and is encoded by entering digits on a telephone by pressing keys.

| Letter | Keys |
|---|---|
| A | 2 |
| B | 2-2 |
| C | 2-2-2 |
| D | 3 |
| E | 3-3 |
| F | 3-3-3 |
| G | 4 |
| H | 4-4 |
| I | 4-4-4 |
| J | 5 |
| K | 5-5 |
| L | 5-5-5 |
| M | 6 |
| N | 6-6 |
| O | 6-6-6 |
| P | 7 |
| Q | 1 |
| R | 7-7 |
| S | 7-7-7 |
| T | 8 |
| U | 8-8 |
| V | 8-8-8 |
| W | 9 |
| X | 9-9 |
| Y | 9-9-9 |
| Z | 1-1 |

-continued

| Letter | Keys |
|---|---|
| Delin | 0 |
| Space | 0-0 |

12. The method of claim 10, wherein said decoding algorithm is defined by the following table, and is encoded by entering digits on a telephone by pressing keys.

| Letter | Keys |
|---|---|
| A | 2-1 |
| B | 2-2 |
| C | 2-3 |
| D | 3-1 |
| E | 3-2 |
| F | 3-3 |
| G | 4-1 |
| H | 4-2 |
| I | 4-3 |
| J | 5-1 |
| K | 5-2 |
| L | 5-3 |
| M | 6-1 |
| N | 6-2 |
| O | 6-3 |
| P | 7-1 |
| Q | 1-1 |
| R | 7-2 |
| S | 7-3 |
| T | 8-1 |
| U | 8-2 |
| V | 8-3 |
| W | 9-1 |
| X | 9-2 |
| Y | 9-3 |
| Z | 1-2 |
| 0 | n/a |
| 1 | 1-0 |
| 2 | 2-0 |
| 3 | 3-0 |
| 4 | 4-0 |
| 5 | 5-0 |
| 6 | 6-0 |
| 7 | 7-0 |
| 8 | 8-0 |
| 9 | 9-0 |
| * | *-0 |
| # | #-0 |
| Delin | n/a |
| Space | 0-0 |

13. A method of utilizing canned messages in a pager, the pager adapted to receive, store, recall, and display messages, and the pager further adapted to receive messages transmitted from an automated paging terminal which accepts message transmission requests from the public switched telephone network wherein standard DTMF telephones are used as message input terminals, comprising the steps of:

selecting a storage address in a canned message memory, enabling a mode of operation in the pager wherein subsequently received messages are stored in the canned message memory at a message storage location defined by said selected storage address, accessing the automated paging terminal via the public switched telephone network using a standard DTMF telephone, entering a tag identifier portion and a canned message portion on a DTMF telephone keypad thereby creating a tagged message, transmitting, by the automated paging terminal, said tagged message, receiving of said tagged message by the pager, parsing said tagged message into said tag identifier portion and said canned message portion, storing said tag identifier portion and said canned message portion in said canned message memory in a pair of linked memory storage locations as defined by said selected storage address, disabling said mode of operation, subsequently receiving messages from said automated paging terminal, parsing said received messages into a tag identifier portion and a data message portion, scanning said canned message memory for a match between said received tag identifier portion with said stored tag identifiers, upon finding a match, recalling said canned message from one of said pair of linked storage locations in said canned message memory, linked to said matched tag identifier, and displaying said canned message and said data message portion on a display.

14. A method of utilizing canned messages in a pager, the pager adapted to receive, store, recall, and display messages, and the pager further adapted to received messages transmitted from an automated paging terminal which accepts message transmission requests from the public switched telephone network wherein standard DTMF telephones are used as message input terminals, comprising the steps of:

selecting a storage address in a canned message memory, enabling a mode of operation in the pager wherein subsequently received messages are stored in a temporary memory, accessing the automated paging terminal via the public switched telephone network using a standard DTMF telephone, entering a tag identifier portion and an encoded canned message portion, comprising numeric data, on a DTMF telephone keypad according to an encoding algorithm related to the placement of alphabetic characters on the DTMF telephone keypad wherein alphanumeric data is thereby encoded, thereby creating a tagged message, transmitting, by the automated paging terminal, said tagged message, receiving said tagged message by the pager, parsing said tagged message into said tag identifier portion and said encoded canned message portion, decoding, into alphanumeric data, said encoded canned message portion according to said algorithm by the pager, thereby creating a decoded canned message, storing said tag identifier portion and said decoded canned message in said temporary memory, displaying said tag identifier portion and said decoded canned message on a display, repeating said accessing, entering, transmitting, receiving, parsing, decoding, storing, and displaying steps until a desired message is displayed, disabling said mode of operation, transferring said tag identifier portion and said decoded canned message from said temporary memory into said canned message memory into a pair of linked storage locations specified by said storage address, subsequently receiving messages from the automated paging terminal, parsing the received data messages into a tag identifier portion and a data message portion, scanning said canned message memory for a match between said tag identifier portion and one of said stored tag identifiers, upon finding a match, recalling said decoded canned message from one of said pair of linked storage locations, linked to said matched tag identifier, and displaying said decoded canned data message on a first page of said display, and displaying said data message portion on a second page of said display.

15. A pager, comprising:

a receiver for selectively receiving messages;

a memory having a plurality of linked pairs of storage locations for storing a tag identifier in the first one of said linked pair of storage locations and for storing a canned message in the second of said linked pair of storage locations, and each of said linked pair of storage locations being identified by a storage address, an actuator, actuatable by the end user of the pager, for specifying one of said storage addresses and enabling a mode of operation of said pager, and a controller coupled to said receiver, said memory, and said actuator, such that when said actuator enables said mode of operation, the next received message, that is received by radio transmission, is parsed into a tag identifier and a canned message, said tag identifier and said canned message being stored in said memory at said linked pair of storage locations identified by said storage address specified by said actuator.

16. The pager of claim 15, wherein:

deactivation of said mode of operation causes said controller to parse subsequently received messages into a tag identifier portion and a data message portion, and said controller recalls said canned message stored in the one of said plurality of storage locations linked with said tag identifier equal to said tag identifier portion.

17. The pager of claim 16, further comprising:

a display coupled to said controller for displaying messages, and wherein, said controller is capable of displaying said canned message and said data message portion.

18. The pager of claim 17, wherein:

said controller is capable of displaying said tag identifier portion.

19. A pager, comprising:

a receiver for selectively receiving messages;

a temporary memory for storing a tag identifier and a canned message, an actuator, actuatable by the end user of the pager, for specifying a storage address and enabling a mode of operation of said pager, and a controller coupled to said receiver, said temporary memory, and said actuator, such that when said actuator enables said mode of operation, the next received message, that is received by radio transmission, is parsed into a tag identifier and a canned message and said tag identifier and said canned message are stored in said temporary memory.

20. The pager of claim 19, wherein:

so long as said mode of operation is enabled, said controller stores every subsequently received message in said temporary memory as one each of said tag identifier and said canned message.

21. The pager of claim 20, further comprising:

a display coupled to said controller, and wherein, said controller is capable of displaying said tag identifier and said canned message stored in said temporary memory.

22. The pager of claim 20, further comprising:

a memory coupled to said controller, said memory having a plurality of linked pairs of storage locations for storing a tag identifier in the first one of said linked pair of storage locations and for storing a canned message in the second of said linked pair of storage locations, and at least one of said linked pair of storage locations being identified by a storage address, and wherein, said controller transfers said tag identifier and said canned message stored in said temporary memory into said memory when said mode of operation is disabled, and said tag identifier and said canned message are stored in the one of said plurality of linked pairs of storage location identified by said storage address specified by said actuator.

23. The pager of claim 22, wherein:

deactivation of said mode of operation causes said controller to parse subsequently received messages into a tag identifier portion and a data message portion, and said controller recalls said canned message stored in the one of said plurality of linked pairs of storage locations linked with said tag identifier equal to said tag identifier portion.

24. The pager of claim 23, wherein:

said controller is capable of displaying said canned message and said data message portion on said display.

25. The pager of claim 24, wherein:

said controller is capable of displaying said tag identifier portion on said display.

26. A pager, comprising:

a receiver for selectively receiving messages;

a memory having a plurality of linked pairs of storage locations for storing a tag identifier in the first one of said linked pair of storage locations and for storing a canned message in the second of said linked pair of storage locations, and each of said linked pair of storage locations being identified by a storage address, an actuator, actuatable by the end user of the pager, for specifying one of said storage addresses and enabling a mode of operation of said pager, and a controller coupled to said receiver, said memory, and said actuator, such that when said actuator enables said mode of operation, the next received message, that is received by radio transmission, is parsed into a tag identifier and a numeric data portion, and said numeric data portion is decoded into a canned message according to a decoding algorithm, and said tag identifier and said canned message are stored in said memory at said linked pair of storage locations identified by said storage address specified by said actuator.

27. The pager of claim 26, wherein:

deactivation of said mode of operation causes said controller to parse subsequently received messages into a tag identifier portion and a data message portion, and said controller recalls said canned message stored in the one of said plurality of storage locations linked with said tag identifier equal to said tag identifier portion.

28. The pager of claim 27, further comprising:

a display coupled to said controller for displaying messages, and wherein, said controller is capable of displaying said canned message and said data message portion.

29. The pager of claim 28, wherein:

said controller is capable of displaying said tag identifier portion.

30. The pager of claim 26, wherein:

said decoding algorithm converts said numeric data portion into said canned message, comprising alphanumeric data, according to the following conversion table:

| Alpha-numeric data | Numeric data |
|---|---|
| A | 2 |
| B | 2-2 |
| C | 2-2-2 |
| D | 3 |
| E | 3-3 |
| F | 3-3-3 |
| G | 4 |
| H | 4-4 |
| I | 4-4-4 |
| J | 5 |
| K | 5-5 |
| L | 5-5-5 |
| M | 6 |
| N | 6-6 |
| O | 6-6-6 |
| P | 7 |
| Q | 1 |
| R | 7-7 |
| S | 7-7-7 |
| T | 8 |
| U | 8-8 |
| V | 8-8-8 |
| W | 9 |
| X | 9-9 |
| Y | 9-9-9 |
| Z | 1-1 |
| Delin | 0 |
| Space | 0-0 |

and the numeric data in said numeric data portion are delineated by the "Delin" character "0" from the above table.

31. The pager of claim 26, wherein:

said decoding algorithm converts said numeric data portion into said canned message, comprising alphanumeric data, according to the following conversion table:

| Alpha-numeric data | Numeric data |
|---|---|
| A | 2-1 |
| B | 2-2 |
| C | 2-3 |
| D | 3-1 |
| E | 3-2 |
| F | 3-3 |
| G | 4-1 |
| H | 4-2 |
| I | 4-3 |
| J | 5-1 |
| K | 5-2 |
| L | 5-3 |
| M | 6-1 |
| N | 6-2 |
| O | 6-3 |
| P | 7-1 |
| Q | 1-1 |
| R | 7-2 |
| S | 7-3 |
| T | 8-1 |

-continued

| Alpha-numeric data | Numeric data |
|---|---|
| U | 8-2 |
| V | 8-3 |
| W | 9-1 |
| X | 9-2 |
| Y | 9-3 |
| Z | 1-2 |
| 0 | n/a |
| 1 | 1-0 |
| 2 | 2-0 |
| 3 | 3-0 |
| 4 | 4-0 |
| 5 | 5-0 |
| 6 | 6-0 |
| 7 | 7-0 |
| 8 | 8-0 |
| 9 | 9-0 |
| * | *-0 |
| # | #-0 |
| Delin | n/a |
| Space | 0-0 |

and the numeric data in said numeric data portion are delineated as every two of said numeric data.

32. A pager, comprising:

a receiver for selectively receiving messages;

a temporary memory for storing a tag identifier and a canned message, an actuator, actuatable by the end user of the pager, for specifying a storage address and enabling a mode of operation of said pager, and a controller coupled to said receiver, said temporary memory, and said actuator, such that when said actuator enables said mode of operation, the next received message, that is received by radio transmission, is parsed into a tag identifier and a numeric data portion and said numeric data portion is decoded into a canned message according to a decoding algorithm, and said tag identifier and said canned message are stored in said temporary memory.

33. The pager of claim 32, wherein:

so long as said mode of operation is enabled, said controller parses, decodes, and stores every subsequently received message in said temporary memory as one each of said tag identifier and said canned message.

34. The pager of claim 33, further comprising:

a display coupled to said controller, and wherein, said controller is capable of displaying said tag identifier and said canned message stored in said temporary memory.

35. The pager of claim 33, further comprising:

a memory coupled to said controller, said memory having a plurality of linked pairs of storage locations for storing a tag identifier in the first one of said linked pair of storage locations and for storing a canned message in the second of said linked pair of storage locations, and at least one of said linked pair of storage locations being identified by a storage address, and wherein, said controller transfers said tag identifier and said canned message stored in said temporary memory into said memory when said mode of operation is disabled, and said tag identifier and said canned message are stored in the one of said plurality of linked pairs of storage location identified by said storage address specified by said actuator.

36. The pager of claim 35, wherein:

deactivation of said mode of operation causes said controller to parse subsequently received messages into a tag identifier portion and a data message portion, and said controller recalls said canned message stored in the one of said plurality of linked pairs of storage locations linked with said tag identifier equal to said tag identifier portion.

37. The pager of claim 36, wherein:

said controller is capable of displaying said canned message and said data message portion on said display.

38. The pager of claim 37, wherein:

said controller is capable of displaying said tag identifier portion on said display.

* * * * *